March 31, 1936.                G. R. ECKSTEIN                2,035,951
VISCOSITY INDICATING DEVICE
Filed Oct. 29, 1931
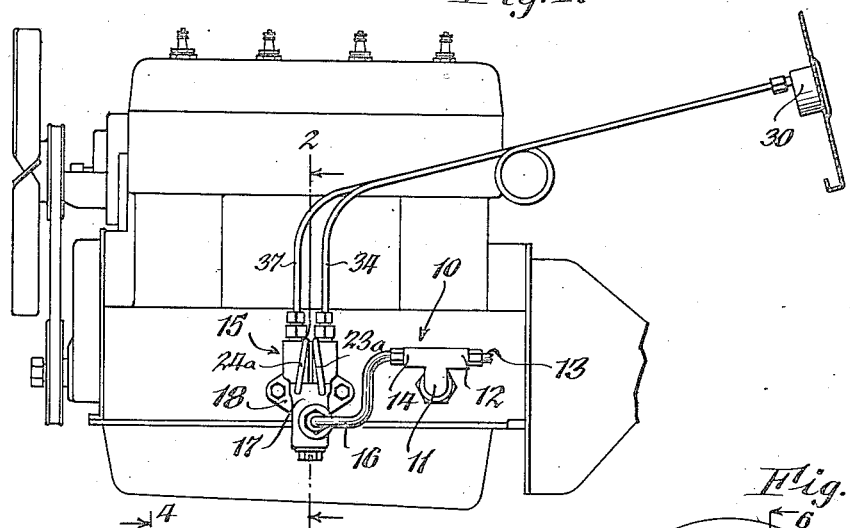
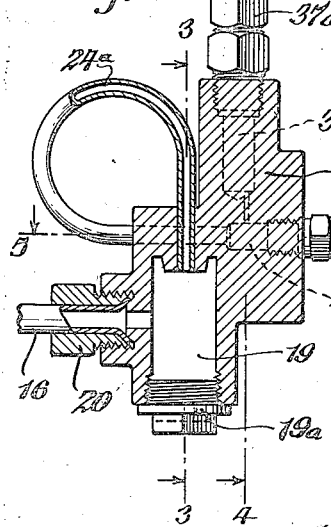
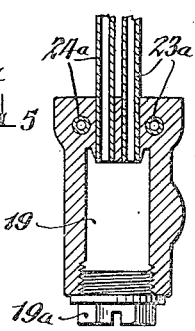
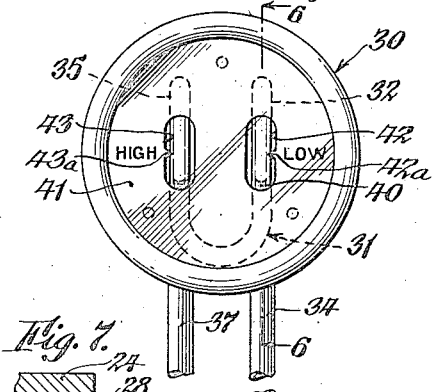
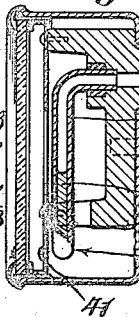
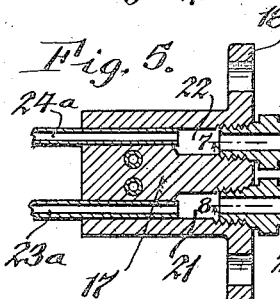
INVENTOR
George R. Eckstein
BY Popp and Powers
ATTORNEYS Patented Mar. 31, 1936

2,035,951

UNITED STATES PATENT OFFICE 2,035,951

VISCOSITY INDICATING DEVICE

George R. Eckstein, Buffalo, N. Y., assignor to Visco Meter Corporation, Buffalo, N. Y., a corporation of New York Application October 29, 1931, Serial No. 571,817

10 Claims. (Cl. 265—11)

This invention relates to improvements in devices for continuously indicating the viscosity condition of a liquid which because of its environment is subject to changes in viscosity. For example, the viscosity of the lubricant in the lubricating system of an automobile engine varies because of derioration and heat. While the range of permissible values of changes in viscosity is substantial, the lubricant after continued use deteriorates to such degree that its modification or replacement is necessary in order to avoid injury to the bearing surface. The continuous indication of the viscosity condition of the lubricant is, therefore, of advantage as it enables the operator to know when to change or modify the lubricant in order, on the one hand to avoid too frequent changes with resultant waste of lubricant which still may be capable of giving satisfactory service and on the other hand to avoid continuing to use a lubricant after its deterioration has gone too far.

For the above purposes there has been proposed a device having a metering chamber to which the liquid, the viscosity of which is to be determined, is supplied under constant determined pressure and this chamber communicates respectively with a liquid discharge passage and with a tube leading to a suitable indicator or gauge. The liquid discharge passage imposes a resistance to the flow of the liquid which resistance will vary with the viscosity. During the flow of the liquid, the counter pressure which is built up in the metering chamber is measured by an indicator or gauge and inasmuch as the counter pressure will vary with variations in the resistance to the flow of the liquid through the discharge passage, the readings of the indicator or gauge may be translated in terms of viscosity. The constant determined pressure in the metering chamber is maintained by a suitable valve which permits discharge of the excess liquid. The liquid discharge passage which imposes a resistance to the flow of the liquid in accordance with its viscosity is in most cases of such a small diameter that it has been necessary to employ a screen for removing particles of foreign matter of such a size as would block or close the liquid discharge passage. A device of this general type is disclosed in the application of Albert B. Shultz Ser. No. 511,796. For accuracy of indication a device of the type disclosed should be connected in a system in which the liquid is delivered to the metering chamber at a pressure in excess of five pounds.

In connection with automobiles which have free wheeling mechanism there is provided means for reducing the oil pressure during the intervals when the engine is automatically disconnected from the drive shaft, the purpose being to maintain oil consumption at a minimum. In practice the automatic reduction in the pressure of the lubricating system is to a value as low as two pounds during free wheeling intervals, the pressure being automatically built up to the required value between such intervals. It will be apparent, therefore, that a device for indicating viscosity conditions in connection with automobiles having free wheeling mechanism must, in order to give accurate indications, be capable of operating at considerably lower pressures than the devices heretofore proposed.

The principal object of the invention is to provide a device which is accurate and reliable in operation, this object being attained by a construction such that the indication is not subject to variations of the pressure in the system in which the liquid is caused to flow. The device, therefore, is capable of accurately and continuously indicating the viscosity of a liquid in a system in which the liquid is under a relatively low pressure, in a system in which the liquid is under a relatively high pressure or in a system in which the pressure varies over a wide range of values.

A further object is to provide a construction wherein no movable parts are required, thereby insuring the quiet operation of the device and avoiding the necessity of replacement of parts thereof because of wear.

A still further object is to provide a device which is capable of long periods of use without requiring attention, this object contemplating the elimination of passages of such a size as require the use of a screening element in order to prevent their clogging.

Devices embodying the features of the invention are particularly adapted for, although not necessarily limited to, use in connection with the lubricating system of an internal combustion engine and such use of the invention is herein illustrated and described by way of example. Likewise such devices are particularly adapted for use in connection with automobiles having free wheeling equipment, it being understood that they may also be used with full advantage in connection with automobiles having solid wheeling equipment.

The invention is illustrated in the accompanying drawing in which:

Figure 1 is a side elevation of an automobile engine equipped with the device in which the features of the invention are incorporated.

Figure 2 is a section taken along line 2—2 of Figure 1.

Figure 3 is a section taken along line 3—3 of Figure 2.

Figure 4 is a section taken along line 4—4 of Figure 2.

Figure 5 is a section taken along line 5—5 of Figure 2.

Figure 6 is a section of the gauge employed in connection with the device and is taken along line 6—6 of Figure 4.

Figure 7 is an enlarged fragmentary view taken along line 7—7 of Figure 5 and illustrates the action of the thin-wall orifice.

Figure 8 is a similar view taken along line 8—8 of Figure 5 and illustrates the action of the thick-wall orifice.

In connection with automobile engines it is the practice to utilize a gauge for indicating the pressure of the lubricant in the lubricating system and for this purpose the latter includes a fitting by which the gauge may be connected in the system, the fitting being secured for convenience upon an outer wall of the engine.

When employed in connection with such a system, the device may be conveniently included in the system through the same medium as the pressure gauge, that is to say, by the pressure gauge fitting, although the connection may be made otherwise if desired. The fitting 10 as illustrated in Figure 1 is preferably of a T construction, its central leg 11 being suitably connected to the piping of the lubricating system. The arrangement of the piping of the system is not material and hence is not illustrated. One arm 12 of the fitting is designed for connection with the usual oil pressure gauge (not shown) through a pipe 13 while the other arm 14 is availed of for the connection of the viscosity indicating device 15 in the lubricating system. The arm 14, therefore, is connected to the device 15 by a pipe 16.

The device 15, as illustrated, comprises a body 17 preferably in the form of a casing which is provided with suitable means for effecting its securement to the engine, for example an attachment flange 18. The body 17 is formed with an inlet chamber 19 which is provided with a clean-out plug 19a and which is in communication with the lubricating system through the pipe 16, the latter being connected to the device 15 by means of a fitting 20. The chamber 19 communicates with two laterally extending metering chambers 21 and 22 through tubes 23a and 24a, respectively. The latter deliver liquid at substantially the same rate to each of the metering chambers and are especially designed to offer resistance to the flow of liquid from the inlet chamber to the metering chambers so as to avoid the diversion of too great a quantity of the liquid from the system. In this connection it will be understood that the tubes 23a and 24a are designed to offer substantially equal resistances to the flow of liquid from the inlet chamber 19 to the metering chambers, thereby delivering the liquid to the said metering chambers at a reduced pressure and at the same time preventing rapid fluctuations in such pressure.

The chamber 21 communicates with a hollow fitting 23 while the chamber 22 communicates with a similar fitting 24, both of said fittings being suitably threaded at their inner ends for securement to the body 17. The fitting 23 is closed at its outer end by a relatively thick wall 25 and the fitting 24 is closed at its outer end by a relatively thin wall 26. The thick wall 25 of the fitting 23 is formed with an orifice 27 while the thin wall of the fitting 24 is formed with an orifice 28. It will be apparent that the liquid which is delivered to the metering chambers 21 and 22 will be discharged through the orifices 27 and 28 respectively. The body 17 is preferably secured to the engine so that the fittings 23 and 24 extend through a wall thereof and hence the liquid discharged from the orifices passes directly back into the crank case.

It is the practice to cause the lubricant in the lubricating system of an automobile engine to circulate under a pressure great enough to force the lubricant to all surfaces requiring lubrication, this being accomplished by a suitable pump. The device 15 being connected in such a system, it follows that lubricant is supplied by the pipe 16 to the inlet chamber 19. From the latter, the lubricant is forced at equal rates through the resistance tubes 23a and 24a to the metering chambers 21 and 22. The coefficient of flow of a liquid through an orifice is dependent, among other things, upon the viscosity of the liquid. In an orifice of the type formed in the fitting 24, that is to say a thin-wall orifice (see Figure 7) the liquid, when of low viscosity is converged into a jet of considerably less cross-sectional area than the cross-sectional area of the orifice. An orifice of this type, therefore, offers a considerable resistance to the flow of a low viscosity liquid. On the other hand, an orifice of the type formed in the fitting 23 (see Figure 7) that is to say, a thick-wall orifice functions in an entirely different manner with low viscosity liquids. In this type of orifice the jet is converged slightly by the leading edge 29 of the orifice but immediately spreads out to completely fill the orifice and emerges therefrom in a "broomy" discharge. When, therefore, the liquid is of a low viscosity the resistance offered to the flow thereof by the orifice 27 will not be very large. In other words, the coefficient of flow of low viscosity liquids through the orifice 27 is, by virtue of the "broomy" discharge, greater than the coefficient of flow of such a liquid through the orifice 28 and this despite the relatively greater frictional resistance offered by the orifice 27 as compared to the orifice 28. It will, therefore, be apparent that when a liquid of relatively low viscosity is being delivered to the device the orifice 28 will offer a greater resistance to the flow of the liquid than will be offered by the orifice 27. Hence, the back or counter pressure of the liquid in the metering chamber 22 will be higher than the back or counter pressure of the liquid in the metering chamber 21.

If, on the other hand, the liquid delivered to the device is of a relatively high viscosity the frictional resistance of the orifice 27 will be considerably more effective while the converging effect of the orifice 28 upon the jet of liquid flowing through it is less effective. It will be apparent, therefore, that when the viscosity of the liquid is high the relative rates of flow of the liquid through the orifices 27 and 28 are reversed, this being a result of the greatly increased frictional resistance offered by the orifice 27. Thus, the rate of flow through the orifice 27 being less than the rate of flow through the orifice 28 the pressure of the liquid in the chamber 21 will, therefore, be greater than the pressure of the liquid in the chamber 22. When the liquid is of a viscosity between the relatively high and relatively low viscosities given by way of example, the differences in pressures of the liquid in the two chambers will not be so great. In point of fact, they may be equal if the resistance offered by the orifice 28 in converging the jet flowing through it is equal to the resistance offered by the orifice 27 by virtue of the frictional resistance of the latter. In other words, if the frictional resistance of the orifice 27, taking into consideration the added factor of the "broomy" discharge is equal to the resistance of the orifice 28 as a result of the converging effect thereof, the pressures of the liquid in the chambers 21 and 22 will be equal. It will be apparent, therefore, that the pressure of the liquid in the chamber 22 may be less than, equal to, or greater than the pressure of the liquid in the chamber 21, the pressures in the two chambers being substantially independent of the variations in pressure of the liquid in the system and varying as the viscosity of the liquid. The difference in pressure between the metering chambers 21 and 22, may, therefore, be availed of to indicate the viscosity of the liquid delivered to the device.

As illustrated, the device 15 is employed in connection with a gauge 30. The latter includes a U-shaped tube 31, one leg 32 of the tube communicating by a pipe 34 with a chamber 33 formed in the body 17 while the other leg 35 communicates by a pipe 37 with a chamber 36, also formed in the body 17. The pipes 34 and 37 may be suitably connected to the body 17 by fittings 34a and 37a respectively. The chambers 33 and 36 communicate with the metering chambers 21 and 22 through ducts 38 and 39 respectively. The tube 31 contains a suitable liquid 40 such, for example, as mercury which normally extends for suitable distances into the legs 32 and 35.

The device 15 being connected in the lubricating system, it follows that the pressure of the lubricant in the metering chamber 21 will be transmitted to the liquid column in the leg 32 of the U-tube 31 while the pressure of the lubricant in the metering chamber 22 will be transmitted to the liquid column in the leg 35 of the said tube. In other words, the pressure in the metering chamber 21 which is transmitted to the liquid column in the tube 31 will be counteracted by the pressure which is transmitted from the liquid in the metering chamber 22. The difference, therefore, between the height of the liquid column in one leg of the tube 21 and the height of the liquid in the other leg of the tube is indicative of the difference or differential in pressures in the metering chambers 21 and 22 and inasmuch as this difference or differential corresponds to the viscosity of the liquid being delivered to the device 15, it is also indicative of the viscosity of the liquid.

The gauge 30 is provided with a face plate 41 which is formed with openings 42 and 43 which expose those portions of the legs 32 and 35 respectively in which the liquid column 40 may fluctuate during the use of the device. The plate 41 may be formed with suitable projections 42a and 43a adjacent the said legs at points which correspond to the positions taken by the liquid column 40 to indicate permissible extremes of low and high viscosity. When the column of liquid approaches or passes either of the projections 42a and 43a, the operator is warned that the viscosity of the lubricant is either too low or too high for safe use and that the lubricant should be either modified or replaced. On the other hand, when the ends of the mercury column are below the low and high marks 42a and 43a, the operator is advised that the viscosity of the lubricant is at a value which is adequate.

From the foregoing, it will be apparent that despite changes in the pressure of the liquid being delivered to the device the viscosity indication will be substantially unaffected by such changes. In other words, any increase or decrease in the pressure in the lubricating system will result in corresponding increases and decreases in the metering chambers 21 and 22. The increase or decrease of the pressure in the said chambers will, of course, be substantially equal and hence the only factor which results in a change of position of the liquid column 40 is a change in viscosity of the liquid. This feature is of decided advantage in that it enables the use of the device in connection with the lubricating systems of automobile engines in which the pressure at various intervals is reduced to a relatively low value while at other times the pressure is increased substantially. In any event, the device is capable of indicating accurately and continuously the viscosity of the lubricant despite such changes in pressure. It will be noted that the ducts 38 and 39 are small and are designed to prevent the rapid flow through them in either direction of the liquid which is delivered to the device. The purpose of the ducts is primarily, therefore, to permit transmission of the pressures which exist in the metering chambers 21 and 22 to the liquid column 40. The ducts 38 and 39, therefore, prevent rapid fluctuations of the liquid column 40 during operation of the device.

It is to be understood that the viscosity of the liquid may be indicated in other ways than by the gauge 30. The illustration is by way of example only, inasmuch as the liquid column 40 may be availed of in any desired manner to indicate the viscosity of the liquid supplied to the device with which it is associated.

It will be apparent that the device has characteristics which render it particularly desirable in systems in which the pressure of the liquid is low or varies over a wide range, the device being designed to give accurate indications of the viscosity of the liquid which are unaffected by changes in the pressure of the liquid. The device has the further advantage that the need for moving parts such as, for example, valves are eliminated. This avoids the necessity of replacing parts because of wear and also insures the quiet operation of the device. The construction, therefore, is not only economical from a manufacturing standpoint but is capable of prolonged periods of use without the need of attention.

I claim as my invention:

1. A device for indicating the viscosity of a liquid in a system in which the liquid is caused to flow including a chamber to which liquid is delivered from said system, means for offering a resistance to the flow of the liquid from said chamber so as to create a pressure in said chamber, a second chamber to which liquid is delivered from said system, the liquid being introduced into each of said chambers at substantially the same pressure, means for offering a resistance to the flow of liquid from said second chamber so as to create a pressure in said second chamber, said first named means offering a greater resistance to the flow of liquid of a relatively low viscosity and a less resistance to the flow of liquid of a relatively high viscosity than the other of said means, whereby the differential of the pressures created in said chambers varies as the viscosity of the liquid, an indicator and means whereby said indicator is rendered responsive to such differential pressures.

2. A device for indicating the viscosity of a liquid in a system in which the liquid is caused to flow including a chamber to which liquid is delivered from said system, said device having an orifice through which the liquid is discharged from said chamber, a second chamber to which liquid is delivered from said system, the liquid being introduced into each of said chambers at substantially the same pressure, said device having a second orifice through which the liquid is discharged from said second chamber, one of said orifices offering a greater resistance to the flow of liquid of a relatively low viscosity and a less resistance to the flow of a liquid of relatively high viscosity than the other of said orifices, whereby the differential between the two pressures created in said chambers varies as the viscosity of the liquid, an indicator and means whereby said indicator is rendered responsive to such differential pressures.

3. A device for indicating the viscosity of a liquid in a system in which the liquid is caused to flow including a body provided with an inlet chamber to which liquid is delivered from said system, a metering chamber, means for conducting liquid to said metering chamber from said inlet chamber, said device having an orifice through which the liquid is discharged from said metering chamber, a second metering chamber, means for conducting liquid to said second metering chamber from said inlet chamber, said device having an orifice through which the liquid is discharged from said second metering chamber, one of said orifices offering a greater resistance to the flow of liquid of relatively low viscosity and a less resistance to the flow of liquid of relatively high viscosity than the other of said orifices, whereby the relation between the counterpressures created in the said metering chambers varies as the viscosity of the liquid, an indicator and means whereby said indicator is rendered responsive to such counterpressures.

4. A device for indicating the viscosity of a liquid in a system in which the liquid is caused to flow including a chamber, means through which liquid is delivered to said chamber from said system, said means offering a predetermined resistance to the flow of said liquid, means for offering a resistance to the flow of the liquid from said chamber so as to create a pressure in said chamber, a second chamber, means through which liquid is delivered to said second chamber from said system, said means offering a resistance to the flow of said liquid substantially equal to the resistance offered by said first mentioned means, means for offering a resistance to the flow of the liquid from said second chamber so as to create a pressure in said second chamber, the means associated with one of said chambers for offering a resistance to the flow of the liquid therefrom offering a greater resistance to the flow of liquid of relatively low viscosity and a less resistance to the flow of liquid of relatively high viscosity than the corresponding means which is associated with the other of said chambers, whereby the relation between the pressures created in the said chambers varies as the viscosity of the liquid, an indicator and means whereby said indicator is rendered responsive to such pressures.

5. A device for indicating the viscosity of a liquid in a system in which the liquid is caused to flow including a chamber, means through which liquid is delivered to said chamber from said system, said means offering a predetermined resistance to the flow of said liquid, said device having an orifice through which the liquid is discharged from said chamber, a second chamber, means through which liquid is delivered to said second chamber from said system, said means offering a resistance to the flow of said liquid substantially equal to the resistance offered by said means first mentioned, said device having a second orifice through which the liquid is discharged from said second chamber, one of said orifices offering a greater resistance to the flow of liquid of relatively low viscosity and a less resistance to the flow of liquid of relatively high viscosity than the other of said orifices whereby the relation between the pressures created in the said chambers varies as the viscosity of the liquid, an indicator and means whereby said indicator is rendered responsive to such pressures.

6. A device for indicating the viscosity of a liquid in a system in which the liquid is caused to flow including an inlet chamber to which liquid is delivered from said system, a metering chamber, a passage providing communication between said inlet chamber and said metering chamber, said passage offering a predetermined resistance to the flow of the liquid to said metering chamber, said device having an orifice through which liquid is discharged from said metering chamber, a second metering chamber, a passage providing communication between said inlet chamber and said second metering chamber, said passage offering a resistance to the flow of liquid to said second metering chamber substantially equal to the resistance offered by said first mentioned passage, said device having a second orifice through which the liquid is discharged from said second metering chamber, one of said orifices offering a greater resistance to the flow of liquid of relatively low viscosity and a less resistance to the flow of liquid of relatively high viscosity than the other of said orifices, whereby the relation between the pressures created in the said metering chambers varies as the viscosity of the liquid, an indicator and means whereby said indicator is rendered responsive to such pressures.

7. A device for indicating the viscosity of a liquid in a system in which the liquid is caused to flow including a chamber to which liquid is delivered from said system, said device having a thin-wall orifice through which the liquid is discharged from said chamber, a second chamber to which liquid is delivered from said system, the liquid being introduced into each of said chambers at substantially the same pressure, said device having a thick-wall orifice through which the liquid is discharged from said second chamber, said thin-wall orifice offering a greater resistance to the flow of liquid of relatively low viscosity and a less resistance to the flow of liquid of relatively high viscosity than said thick-wall orifice, whereby the differential between the pressures created in said chambers varies as the viscosity of the liquid, an indicator and means whereby said indicator is rendered responsive to such differential pressures.

8. A device for indicating the viscosity of a liquid in a system in which the liquid is caused to flow including an inlet chamber to which liquid is delivered from said system, a metering chamber, means for conducting liquid to said metering chamber from said inlet chamber, said device having a thin-wall orifice through which the liquid is discharged from said metering chamber, a second metering chamber, means for conducting liquid to said second metering chamber from said inlet chamber, said device having a thick-wall orifice through which the liquid is discharged from said second metering chamber, said thin-walled orifice offering a greater resistance to the flow of liquid of relatively low viscosity and a less resistance to the flow of liquid of relatively high viscosity than said thick wall orifice, whereby the relation between the pressures created in said metering chambers varies as the viscosity of the liquid, an indicator and means whereby said indicator is rendered responsive to such pressures.

9. A device for indicating the viscosity of a liquid in a system in which the liquid is caused to flow including an inlet chamber to which the liquid is delivered from said system, a metering chamber, a passage through which said metering chamber communicates with said inlet chamber, said passage offering a predetermined resistance to the flow of liquid through it, said device having a thin-wall orifice through which the liquid is discharged from said metering chamber, a second metering chamber, a passage through which said second metering chamber communicates with said inlet chamber, said passage offering a resistance to the flow of liquid through it substantially equal to the resistance to flow offered by said first mentioned passage, said device having a thick-wall orifice through which the liquid is discharged from said second metering chamber, said thin-wall orifice offering a greater resistance to the flow of liquid of relative low viscosity and a less resistance to the flow of liquid of relative high viscosity than said thick-wall orifice, whereby the relation between the pressures created in said metering chambers varies as the viscosity of the liquid an indicator and means whereby said indicator is rendered responsive to such pressures.

10. A device for indicating the viscosity of a liquid in a system in which the liquid is caused to flow including an inlet chamber to which the liquid is delivered from said system, a metering chamber, a tube through which said metering chamber communicates with said inlet chamber, said tube offering a predetermined resistance to the flow of liquid through it, said device having a thin-wall orifice through which the liquid is discharged from said metering chamber, a second metering chamber, a tube through which said second metering chamber communicates with said inlet chamber, said tube offering a resistance to the flow of a liquid through it substantially equal to the resistance offered by said first mentioned tube, said device having a thick-wall orifice through which the liquid is discharged from said second metering chamber, said thin-wall orifice offering a greater resistance to the flow of liquid of relatively low viscosity and a less resistance to the flow of liquid of relatively high viscosity than said thick-wall orifice, whereby the relation between the pressures created in said metering chambers varies as the viscosity of the liquid an indicator and means whereby said indicator is rendered responsive to such pressures.

GEORGE R. ECKSTEIN.